(12) United States Patent
Schneider

(10) Patent No.: US 7,161,578 B1
(45) Date of Patent: Jan. 9, 2007

(54) UNIVERSAL PRESENTATION DEVICE

(75) Inventor: Gerhard A. Schneider, Mex (CH)

(73) Assignee: Logitech Europe S.A. (CH)

( * ) Notice: Subject to any disclaimer, the term of this patent is extended or adjusted under 35 U.S.C. 154(b) by 98 days.

(21) Appl. No.: 09/632,196

(22) Filed: Aug. 2, 2000

(51) Int. Cl.
*G09G 5/00* (2006.01)

(52) U.S. Cl. .................. 345/156; 345/169; 345/168

(58) Field of Classification Search ........ 345/156–169, 345/173, 179; 348/14.05
See application file for complete search history.

(56) References Cited

U.S. PATENT DOCUMENTS

| | | | |
|---|---|---|---|
| 4,521,772 A | 6/1985 | Lyon | |
| 4,521,773 A | 6/1985 | Lyon | |
| 4,794,384 A | 12/1988 | Jackson | |
| 4,799,055 A | 1/1989 | Nestler et al. | |
| 5,288,993 A | 2/1994 | Bidiville et al. | |
| 5,420,943 A | 5/1995 | Mak | 382/313 |
| 5,453,758 A | 9/1995 | Sato | |
| 5,457,478 A | 10/1995 | Frank | |
| 5,532,753 A * | 7/1996 | Buchner et al. | 725/56 |
| 5,578,813 A | 11/1996 | Allen et al. | |
| 5,578,817 A | 11/1996 | Bidiville et al. | |
| 5,617,304 A | 4/1997 | Huang | |
| 5,644,139 A | 7/1997 | Allen et al. | |
| 5,690,418 A | 11/1997 | Hsiung | |
| 5,697,700 A | 12/1997 | Huang | |
| 5,703,353 A | 12/1997 | Blalock et al. | |
| 5,703,356 A | 12/1997 | Bidiville et al. | |
| 5,729,008 A | 3/1998 | Blalock et al. | |
| 5,729,009 A | 3/1998 | Dändliker et al. | |
| 5,769,384 A | 6/1998 | Baumgartner et al. | |
| 5,786,804 A | 7/1998 | Gordon | |
| 5,793,356 A | 8/1998 | Svancarek et al. | |
| 5,803,582 A | 9/1998 | Hunag | |
| 5,825,044 A | 10/1998 | Allen et al. | |
| 5,838,639 A | 11/1998 | Hwang | |
| 5,854,482 A | 12/1998 | Bidiville et al. | |
| 5,854,621 A | 12/1998 | Junod et al. | |
| 5,881,366 A | 3/1999 | Bodenmann et al. | |
| 5,882,106 A | 3/1999 | Galli | |
| 5,907,152 A | 5/1999 | Dändliker et al. | |
| 5,940,217 A | 8/1999 | Broome et al. | |
| 5,952,997 A * | 9/1999 | Hu | 345/163 |
| 5,993,026 A | 11/1999 | Wu | |

(Continued)

FOREIGN PATENT DOCUMENTS

DE        298 23 417        5/1999

(Continued)

OTHER PUBLICATIONS

Interactive RF Remote Control for Presentations—User's Guide, version 1.6, 1998, and data sheet, 1999, Interlink Electronics, Inc., Camarillo, CA, USA.

(Continued)

*Primary Examiner*—Richard Hjerpe
*Assistant Examiner*—Duc Q Dinh
(74) *Attorney, Agent, or Firm*—Townsend and Townsend and Crew LLP

(57) ABSTRACT

A universal presentation device discloses having two or more presentation elements for use in environments such as presentation environments. For example, the universal presentation device may include a combination of a laser pointer element, a pointing device element, and/or a writing instrument element. The universal presentation device is dimensioned to house each element within a single logical housing. Further, each element is operable with any of the other elements present within the universal presentation device. A method of operating the universal presentation device, including its use environment, is also disclosed.

45 Claims, 11 Drawing Sheets

U.S. PATENT DOCUMENTS

| | | | |
|---|---|---|---|
| 5,994,710 A | 11/1999 | Knee et al. | |
| 6,002,457 A | 12/1999 | Yun et al. | |
| 6,002,525 A | 12/1999 | Poulo et al. | |
| 6,014,132 A * | 1/2000 | Shimada et al. | 345/173 |
| 6,021,009 A | 2/2000 | Borodovsky et al. | |
| 6,022,126 A | 2/2000 | Sekine et al. | |
| 6,040,592 A | 3/2000 | McDaniel et al. | |
| 6,040,950 A | 3/2000 | Broome | |
| 6,049,338 A | 4/2000 | Anderson et al. | |
| 6,057,540 A | 5/2000 | Gordon et al. | |
| 6,081,261 A | 6/2000 | Stork et al. | |
| 6,084,574 A | 7/2000 | Bidiville | |
| 6,104,020 A | 8/2000 | Knee et al. | |
| 6,133,907 A * | 10/2000 | Liu | 345/183 |
| 6,145,746 A | 11/2000 | Bard et al. | |
| 6,151,015 A | 11/2000 | Badyal et al. | |
| 6,157,591 A | 12/2000 | Krantz | |
| 6,175,357 B1 | 1/2001 | Gordon | |
| 6,181,329 B1 * | 1/2001 | Stork et al. | 178/19.01 |
| 6,188,057 B1 | 2/2001 | Misek | |
| 6,212,296 B1 * | 4/2001 | Stork et al. | 382/188 |
| 6,233,368 B1 | 5/2001 | Badyal et al. | |
| 6,275,174 B1 * | 8/2001 | Stork et al. | 341/20 |
| 6,417,840 B1 * | 7/2002 | Daniels | 345/158 |
| 6,424,335 B1 | 7/2002 | Kim et al. | |
| 6,545,664 B1 * | 4/2003 | Kim | 345/158 |
| 2003/0028688 A1 | 2/2003 | Tiphane et al. | |

FOREIGN PATENT DOCUMENTS

| | | |
|---|---|---|
| EP | 0 798 659 | 10/1997 |
| WO | WO 91/07826 | 5/1991 |
| WO | WO 97 41502 | 11/1997 |
| WO | WO 98/37379 | 8/1998 |
| WO | WO 99/39304 | 8/1999 |
| WO | WO 00/33245 | 6/2000 |
| WO | WO 00/38103 | 6/2000 |

OTHER PUBLICATIONS

Logitech TrackMan Live, [online], [retrieved on Dec. 5, 2002]. Retrieved from the Internet: <URL: http://www.001abc.com/mouse/Logitech_trackman_live.html.

Bortz, J., Shatz, N., Pitou, D., "Optimal Design of a Nonimaging Projection Lens for Use With an LED Source and a Rectangular Target", Proceedings of SPIE, vol. 4092, 2000.

Agilent Technologies, "Solid-State Optical Mouse Sensor with PS/2 and Quadrature Outputs," Technical Data, May 2000, 10 pages.

Hinckley, Ken and Sinclair, Mike, "Touch-Sensing Input Deveices," Microsoft Research (To appear in ACM CHI'99 Conf. On Human Factors in Computing Systems), 1999, 8-pages.

FreePen® On-line [online]. Kanitech, 1999 [retrieved on Oct. 29, 1999]. Retrieved from the Internet: <URL:www.freepen.com/index2.htm>.

GyroMouse Pro [online]. Diamond Multimedia Systems, Inc., 1998/99 [retrieved on Oct. 29, 1999]. Retrieved from the Internet: <URL:www.diamondmm.com/products/current/gyromouse.cfm>.

* cited by examiner

UNIVERSAL PRESENTATION DEVICE

BACKGROUND OF THE INVENTION

1. Field of the Invention

The present invention relates to presentation devices, and more particularly, to a multi-function presentation device.

2. Description of Background Art

Conventional computer pointing devices such as a computer mouse, a trackball, or a touchpad, are known. A conventional pointing device allows a user to control operation of a cursor on a computer display. Most conventional pointing devices are connected to a computer through a wire. This limits the use of such conventional pointing devices as a control and presentation tool because the wire limits their range of movement and flexibility of connection.

Conventional cordless pointing devices allow for greater range of movement and connection flexibility. Conventional cordless pointing devices are preferred for control and presentation tools because the lack of a cord allows a user to freely move about while continuing to maintain control of a cursor on a computer display. However, a problem with conventional cordless pointing devices is that their use is limited only to the computer on which their receiver is connected. Moreover, the conventional cordless pointing device is not useful with other presentation items such as a dry erase board, a poster board, a physical exhibit, or the like.

For non computer-based presentations, a user typically will use a conventional laser pointer to point to the presentation item. The conventional laser pointer includes a low power laser that allows the user to shine a concentrated light beam on a specific spot on the presentation item. Moreover, the conventional laser pointer can also be used to point to a particular location on a computer display screen. However, the conventional laser pointer cannot be used to actually control the cursor on the display screen.

Thus, there is an increased number of devices needed when giving a multifaceted presentation. Such an increase creates a number of problems. For example, too many devices can potentially restrict freedom of movement for the user. Further, a user must remember all the different devices that are required for any particular presentation. This can be cumbersome and potentially unprofessional because a user must remember each device, its use, and its location at all times, for example, during a presentation to an audience.

Therefore, there is a need for a universal control device that (1) allows a user to have a unitary, integrated presentation and control system and (2) allows for modularity to help increase functionality of the system.

SUMMARY OF THE INVENTION

The present invention includes an all-in-one, or universal, presentation device. The universal presentation device may include two or more presentation elements within a substantially unitary configuration or article. Presentation elements include, for example, a laser pointer element, an electronic control device element (or computer pointing device element), or a writing instrument element.

In one embodiment, the universal presentation device houses two presentation elements, for example, the laser pointer element and the pointing device element, within an elongated housing. In addition, the universal presentation device may include additional presentation elements, for example, a writing instrument element. The writing instrument element allows a user of the universal presentation device to use pen-like features with the laser pointer and control device features already present within the unitary article. Generally, the universal presentation device is beneficially dimensioned substantially similar to a pen. This configuration is useful in allowing use of a variety of presentation elements including the disclosed laser pointer, control device, and writing instrument. Moreover, this configuration beneficially provides the user with a generally convenient and familiar feel when using the universal presentation device. The structure can be dimensioned to include a housing having a length, width and height that accommodates a multitude of users.

In an alternative embodiment the universal presentation device is configured to include two distinct presentation portions that couple together to form a unitary article. Each portion may include one or more functional presentation elements for the universal presentation device. For example, one portion may include a laser pointer element and a second portion may include a pointing device element. In this embodiment, each portion is reconfigurable so that, for example, the pointing device portion may be replaced by a writing instrument element portion. Moreover, because each portion may include functionality of more than one presentation element, one portion may include a laser pointer element and a writing instrument element and a second portion may include a control device element. In this embodiment, each portion can be sized accordingly to accommodate the desired overall device dimensions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The above and other more detailed and specific objects and features of the present invention are more fully disclosed in the following detailed description, reference being had to the accompanying drawings, in which.

DETAILED DESCRIPTION OF THE PREFERRED EMBODIMENTS

The present invention is discussed with the reference to the Figures in which similar reference numbers of components may indicate like or similar functionality. The present invention includes a universal presentation device that may provide multiple functions, for example, a writing function, an electronic control device function, and/or a pointing device function. The present invention includes an all-in-one, or universal, presentation device. The universal presentation device may include two or more presentation elements within a substantially unitary configuration or article.

Exemplary Embodiments

Figure 1A:
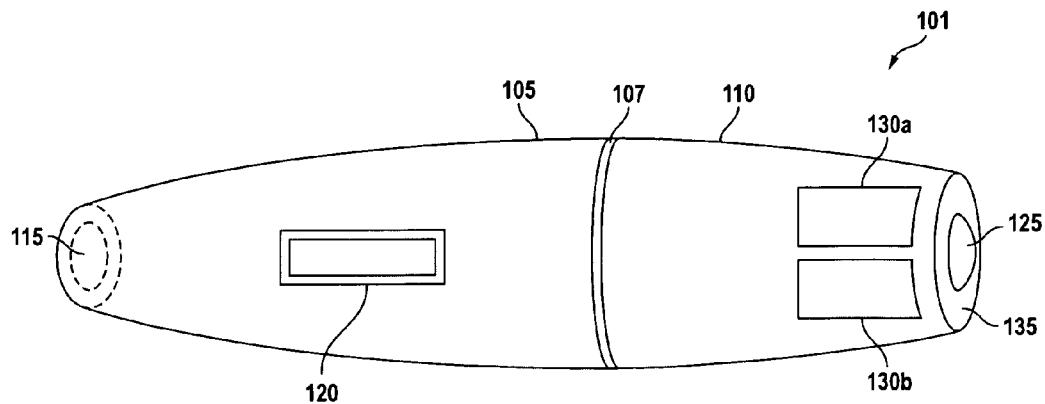
FIG. 1a is an illustration of a first embodiment of a universal presentation device in accordance with the present invention.

The present invention may be described through the exemplary illustrations set forth in FIGS. 1a through 5b. FIG. 1a illustrates a first embodiment of a universal presentation device 101 in accordance with the present invention. The first embodiment of the universal presentation device 101 includes a first portion 105, a second portion 110, and a band 107. The first portion 105 of the universal presentation device 101 includes a first presentation element, for example, a coherent light source element such as a laser pointer element. The laser pointer element includes a laser pointer lens 115 and a laser pointer switch button 120.

The second portion 110 of the universal presentation device 101 includes a second presentation element. The second presentation element may be an electronic control device, for example, a computer pointing device element. The pointing device element includes one or more pointing device buttons (generally 130), e.g., 130a, 130b, and a roller ball assembly 135. The roller ball assembly 135 includes a roller ball 125. The pointing device buttons 130 and the roller ball assembly 135 are functionally similar to conventional pointing device buttons and roller ball assemblies found on conventional pointing devices, for example, a conventional computer mouse-type pointing device, a conventional computer trackball-type pointing device, or a conventional computer touchpad-type pointing device.

The first portion 105, the second portion 110, and the band 107 generally form a unitary configuration or article (e.g., an apparatus). In one embodiment the first portion 105 and the second portion 110 may be, for example, physically separate housings that may couple about the band 107. The physically separate portions may be configured to release and re-attach to one another. In yet another embodiment, the first portion 105 and the second portion 110 may be, for example, a single or unitary housing having a first and a second logical portion within the housing. In this embodiment the band 107 is optional or may be present around a circumference of the housing for cosmetic purposes.

The first portion 105 and the second 110 may be configured to form an elongated housing within which both the laser pointer element and the pointing device element are present. In this embodiment, the laser pointer lens 115 of the laser pointer element is substantially at a first end of the first portion 105 of the universal presentation device 101. The laser pointer button 120 is located along the surface of the first portion 105. A second end of the first portion 105 meets a second end of the second portion 110.

The roller assembly 135 of the pointing device element is substantially at a first end of the second portion 110 of the universal presentation device. The pointing device buttons 130a, 130b are located along the surface, (e.g., proximate to the roller assembly 135), of the second portion 110 of the universal presentation device 101. Thus, in this configuration the laser pointer lens 115 and the roller assembly 135 are on substantially opposite ends of the unitary configuration of the universal presentation device 101 and the pointing device buttons 130 are along the surface proximate to the roller assembly 135. In alternative embodiments, the roller assembly 135 may be another type of control assembly, for example, a tip stick assembly (e.g., an eraser tip), mini-joystick assembly, or a touch sensing assembly.

The first embodiment of the universal presentation device 101 may have a substantially cylindrical-shaped configuration, a bar shaped configuration, an elongated barrel shaped configuration, or a variety of other geometrical configurations that are capable of housing at least a laser pointer element and a pointing device element. Those of skill in the art will recognize that the shape of the universal presentation device 101, including each portion 105, 110, can be ergonomically suited to the human hand such that the device is easy to hold and readily usable. For example, the universal presentation device 101 may be approximately 10 to 20 centimeters in length, approximately 1 to 6 centimeters in height, and approximately 1 to 6 centimeters in width. In addition, each portion 105, 110 may be approximately 5 to 10 centimeters in length, approximately 1 to 6 centimeters in height, and approximately 1 to 6 centimeters in width.

Alternatively, the device can have a shape that requires only limited or no manual dexterity of the hands. For example, the universal presentation device may be housed in a 6×6×1 cm³ box that is mountable to an object such a table or wheelchair. The size of the functional features such as buttons or roller balls can be exaggerated to ease use. From this disclosure, those of skill in the art will recognize that other dimensions are also envisioned for this and other embodiments of the universal presentation device disclosed herein.

Figure 1B:
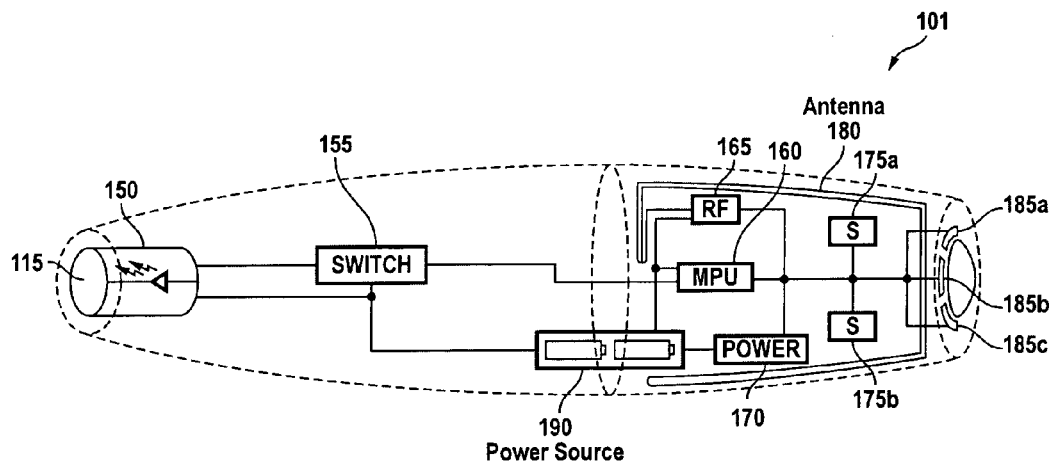
FIG. 1b is a block diagram illustration of components within the first embodiment of the universal presentation device in accordance with the present invention.

FIG. 1b is a block diagram illustration of components within the first embodiment of the universal presentation device 101 in accordance with the present invention. The components of the first embodiment of the universal presentation device 101 includes laser unit 150, a laser switch 155, a microcontroller (or microprocessor) unit ("MCU") 160, a radio frequency ("RF") unit 165, a power management unit 170, a power source 190, one or more switches (generally 175), e.g., a first switch 175a and a second switch 175b, an antenna system 180, and one or more position sensors (generally 185), e.g., 185a, 185b, 185c, in a roller ball assembly 135. The roller ball assembly 135, including the roller ball 125 and the one or more sensors 185, form a control mechanism.

With regard to the laser pointer element, the laser unit 150 electrically couples with the laser switch 155. The laser switch 155 couples with the laser pointer switch button 120 of FIG. 1a. The laser switch 155 electrically couples the laser unit 150 with the power source 190 when the laser unit is in an on state, and decouples the laser unit 150 from the power source 190 when the laser unit is in an off state. In one embodiment, the laser unit 150 is a conventional laser unit that includes a conventional laser diode. When the laser unit 150 is in an on state, the laser diode generates a coherent light beam (or laser beam) that is emitted through a conventional laser lens, e.g., laser pointer lens 115. This coherent light beam may be shined on an object to "point" to that object.

With regard to the pointing device element, the MCU 160, electrically couples with the RF unit 165, the power management unit 170, the switches 175, and the position sensors 185. The MCU 160 also communicatively couples with a conventional computer unit through the RF unit 165. The power source 190 electrically couples with the MCU 160, the RF unit 165, the power management unit 170, the switches 175, and the position sensors 185. The antenna system 180 couples with the RF unit 165. The switches 175 respectively couple to the pointing device buttons 130 of FIG. 1a. Within the roller ball assembly, the roller ball 125 is in contact with the position sensors 185.

In one embodiment, the MCU 160 is a convention microcontroller (or microprocessor) unit that may include a memory cache. For example, the MCU may be an Intel microcontroller (e.g., MCS 96 or 51 microcontroller family) or a Motorola microcontroller (e.g. 68HCxx or MPC- or MMC-family microcontrollers). The MCU 160 provides operational control over the functions of the pointing device element. The MCU also communicates with a conventional computer unit through the RF unit 165. The RF unit 165 is a conventional radio frequency transceiver (transmitter and/or receiver) that communicates through radio frequency transmission with a conventional host computer having an RF transceiver. In particular, the RF transceiver of the RF unit 165 electrically couples with RF transceiver in the host computer and a host antenna system. The antenna system 180 of the universal presentation device 101 is a conventional radio-frequency antenna system, for example, a loop antenna system or a whip antenna system. This antenna system 180 couples with the host antenna system to help facilitate RF communication between the universal presentation device 101 and the host computer.

The pointing device switches 175 are conventional pointing device switches similar to those found on conventional pointing devices. The pointing device switches 175a, 175b are configured to provide a selection mechanism for a user of the universal presentation device 101. The position sensors 185 are conventional position sensors for a pointing device. The position sensors 185 and the roller ball 125 provide a movement mechanism for a user of the universal presentation device 101 as the ball is rotated within the roller ball assembly 135.

The power management unit 170 is a conventional power management unit and is optional in the pointing device portion of the universal presentation device 101. The power management unit 170 may be used to manage power consumption of the components of the pointing device portion. For example, the power management unit 170 extends power source life by placing the RF unit 165 in an off state when the pointing device is not transmitting information back to the computer host. In addition, the power management unit 170 may place the entire pointing device element in a sleep mode or off states when the pointing device is not in use for some time or is not used at all. The power source unit 190 is a conventional power source unit that provides direct current or alternate current power. For example, the power source unit 190 may include two 1.5-volt battery power cells.

Figure 1C:
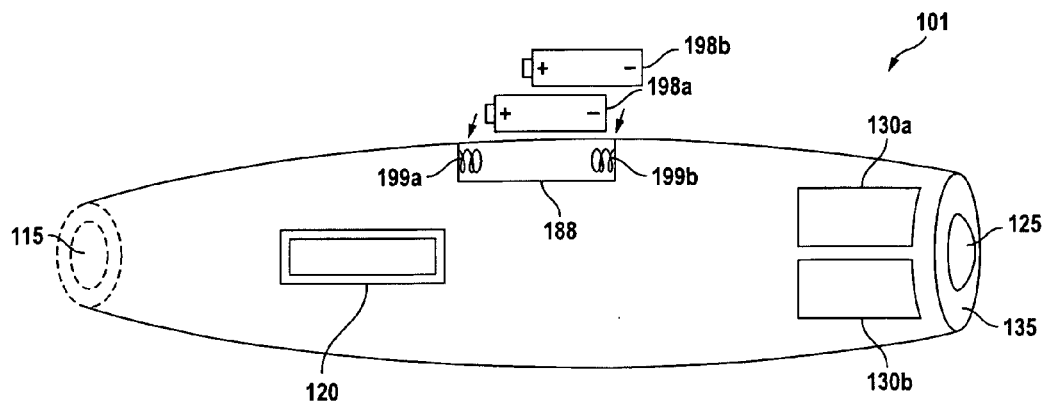
FIG. 1c is an illustration of an embodiment of a power source subhousing opening for a power supply source for a universal presentation device in accordance with the present invention.

Briefly, FIG. 1c illustrates one embodiment of a power source subhousing (or compartment) 188 within a universal presentation device, e.g., 101, in accordance with the present invention. The power source subhousing 188 includes at least one power source contact, e.g., 199a, 199b, for appropriate polarities of a power source. The power source may be, for example, one or more batteries, e.g. 198a, 198b. The batteries, e.g. 198a, 198b, are placed within the power source subhousing 188 to provide a power supply for the electronic components of the universal presentation device, e.g. 101. It is noted that the power source subhousing 188 may be configured in a multitude of locations on and/or within the universal presentation device, e.g., 101.

In an example of operation of the universal presentation device 101, the pointing device element communicatively couples with a conventional computer unit (or host). Particularly, the RF unit 165 of the universal presentation device 101 couples with an RF transceiver associated with the computer host. The conventional computer host includes, for example, a conventional RF transceiver, a conventional microprocessor, a conventional memory, a conventional storage device, and a display (or screen). The computer host also includes a conventional computer operating system that resides in the conventional storage device and/or the conventional memory. The conventional computer host may also include one or more computer application programs that also reside in the conventional storage device and/or conventional memory. A user may interact with a conventional application program through the universal presentation device 101.

When the user of the universal presentation device 101 selects an action, for example, highlighting a word on a word processing application displayed on the computer screen, the user rotates the roller ball 125 of the roller assembly 135 until a cursor on the screen is on top of the desired word. The user then selects the word by depressing (e.g., clicking or double clicking) on one of the pointing device switch buttons, e.g., 130a. The respective pointing device switch sends an electrical signal to the MCU 160 indicating that a selection has been made. The MCU 160 communicates to the computer host through the RF unit 165 that the pointing device switch button, e.g. 130a has been selected. The RF unit 165 transmits an RF signal via the antenna system 180. The RF transceiver unit at the computer host receives the RF signal and sends an electrical signal to the microprocessor of the computer host to interpret the selected switch button to highlight the selected word.

The user may also use the laser pointer element of the universal presentation device 101 to point to, for example, the computer screen. Specifically, the user may point the laser pointer lens 115 in the direction of the computer screen and depress the laser pointer switch button 120. The laser pointer switch 155 triggers on the laser unit 150. Within the laser unit 150, the laser diode turns on and generates a coherent light beam. The coherent light beam is a highly focused light beam that is emitted in the direction that the laser pointer lens 115 points. For example, if the laser pointer lens 115 is pointed towards the computer screen, the coherent light beam is focused on the computer screen. The user can use the laser pointer to point out something on that computer screen, for example, the highlighted word selected by the pointing device element.

Figure 2A:
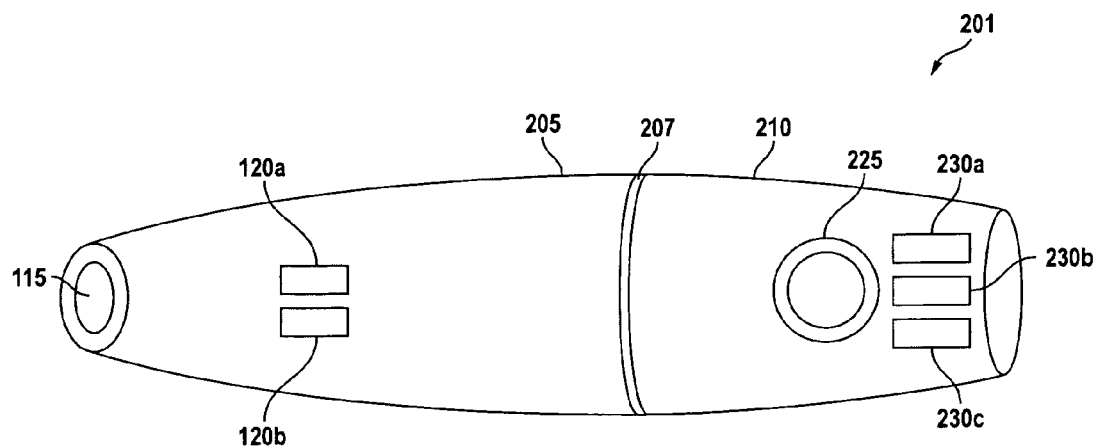
FIG. 2a is an illustration of a second embodiment of a universal presentation device in accordance with the present invention.

FIG. 2a is an illustration of a second embodiment of a universal presentation device 201 in accordance with the present invention. The second embodiment of the universal presentation device 201 includes a first portion 205, a second portion 210, and an optional band 207, similar to the first embodiment of the universal presentation device 101. As with the first embodiment 101, the first and the second portions 205, 210 may, for example, be two separate physical portions that may be configured into a unitary device or may be two logically separate portions that may be configured to provide particular functionality at each portion.

For example, similar to the first embodiment 101, the second embodiment 201 includes a laser pointer element and a pointing device element. In the second embodiment 201, the first portion 205 may be configured to include components of the laser pointer element, for example, the laser pointer lens 115 and one or more laser pointer switch buttons (generally 120), e.g., 120a, 120b. The second portion 210 may be configured to include components of the pointing device, for example, a roller assembly 225 and one or more pointing device switch buttons (generally 230), e.g., 230a, 230b, 230c. It is noted that the roller assembly 225 is a conventional roller ball unit that includes a roller ball and is functionally similar to a roller assembly 135. The pointing device switch buttons 230 are also conventional pointing device switch buttons and are functionally similar to the pointing device switch buttons 130 described above.

As with the first embodiment 101, the laser pointer lens 115 is located substantially at one end of the first portion 205 of the second embodiment of the universal presentation device 201. The one or more laser pointer buttons, e.g., 120a, 120b, are located along the surface of the first portion 205. The roller assembly 225 is configured for placement along the surface of the second portion 210 of the second embodiment of the universal presentation device 201. Similarly, the pointing device buttons, e.g., 230 are also located along the surface of the second portion 210 of the second embodiment of the universal presentation device 201. It is noted that the pointing device buttons, e.g., 230, may be located substantially within the same plane as the roller assembly 225 or may be located such that one pointing device button is substantially within the same plane and one or more additional pointing device buttons are in different planes. Numerous other configurations are recognizable from this disclosure.

Figure 2B:
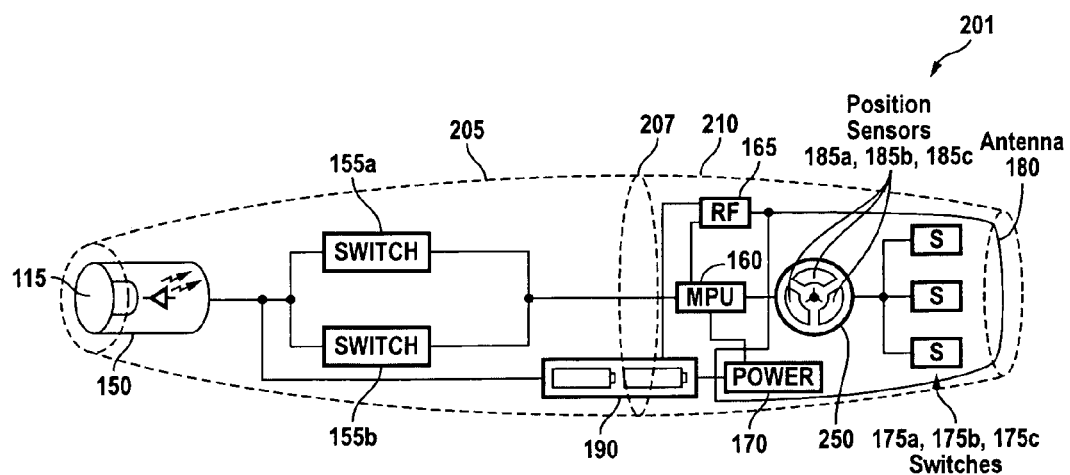
FIG. 2b is a block diagram illustration of components within the second embodiment of the universal presentation device in accordance with the present invention.

FIG. 2b is a block diagram illustration of components within the second embodiment of the universal presentation device 201 in accordance with the present invention. Components for the laser element within the second embodiment 201 include the laser unit 150 and the one or more laser pointer switches (generally 155), e.g., 155a, 155b. Components for the pointing device element within the second embodiment 201 includes the MCU 160, the RF unit 165, the optional power management unit 170, the one or more pointing device switches, e.g., 175a, 175b, 175c, the antenna system 180, and the one or more position sensors (generally 185), e.g., 185a, 185b, 185c. The position sensors 185 are located within a roller ball cage 250 that is included within the roller assembly 225 of FIG. 2a. The second embodiment of the universal presentation device 201 also includes one or more power sources, e.g., 190.

Generally, the component configuration and operation of the second embodiment of the universal presentation device 201 is functionally similar to the first embodiment 101. For example, with regard to the laser pointer element, in the second embodiment of the universal presentation device 201, the laser pointer switch buttons 120a, 120b couples with the laser switches 155a and 155b, respectively. The laser switches 155 couple with the laser unit 150. The laser pointer lens 115 may be a part of the laser unit 150, or may be a separate component. The laser unit 150 includes a light emitting diode, e.g., a laser diode. The laser unit 150 electrically couples with the power source 190 through the laser switches 155 when the laser unit 150 is in an on state, and decouples from the power source 190 when the laser unit 150 is in an off state. Further, in this embodiment 201, one laser switch 155a may be used to keep the laser unit 150 in a continually on state while the second laser switch 155b may be used to pulse the laser unit 150 on and off.

With regard to the pointing device elements, in the second embodiment of the universal presentation device 201, the MCU 160 couples with the RF unit 165, the power management unit 170, the antenna system 180, the pointing devices switches 175, and the position sensors 185 within the roller assembly. The power source 190 couples with the MCU 160, the RF unit 165, the power management unit 170, the pointing device switches 175, and the position sensors 185. The antenna system 180 couples with the RF unit 165. The antenna system 180 also electrically and/or magnetically couples with an antenna system that couples with an RF receiver that electrically couples with the host computer.

As with the first embodiment 101, the second embodiment of the universal presentation device 201 is dimensioned to house a laser pointer element and a pointing device element. Further, the second embodiment of the universal presentation device 201 advantageously allows for simultaneous and independent use of the laser pointer element and the pointing device element. For example, as discussed above, the pointing device element can be used to interact with an application program at the host computer while the laser pointer can be used to point to the host computer display, or to some other object that is physically out of reaching distance.

Figure 3A:
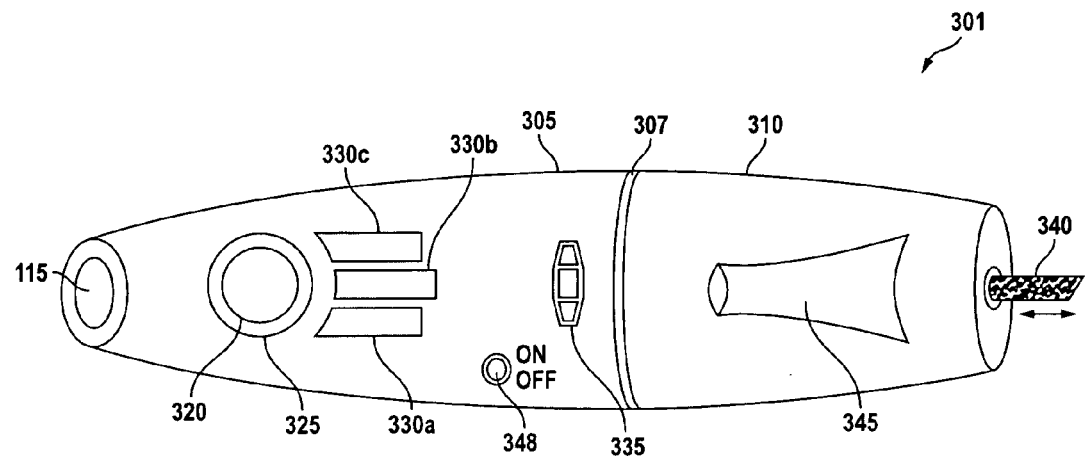
FIG. 3a is an illustration of a third embodiment of a universal presentation device in accordance with the present invention.

FIG. 3a is an illustration of a third embodiment of a universal presentation device 301 in accordance with the present invention. The third embodiment of the universal presentation device 301 includes a first portion 305, a second portion 310, and an optional band 307, similar to the first and second embodiments 101, 201 of the universal presentation device 101. As with the first and second embodiments 101, 201 the first and the second portions 305, 310 may be two separate physical portions that may be configured into a unitary device or may be two logically separate portions that may be configured to provide particular functionality at each portion.

For example, in the third embodiment of the universal presentation device 301, the first portion 305 may include a laser pointer element and a pointing device element and the second portion 310 may include another presentation element, for example, a writing device element. The laser pointer element may be functionally similar to a conventional laser pointer, for example, an aim and turn-on presentation laser pointer-type device. The pointing device element may be functionally similar to a conventional computer pointing device, for example, a computer mouse-type device, a computer trackball-type device, or a computer touch-pad type device. The writing device element may be a conventional writing device, for example, a pen, a pencil, a chalk, a crayon, a marker, a highlighter, or the like. The writing device element may also be a conventional stylus-type device, for example, a stylus for use with an electronic personal digital assistant.

The third embodiment of the universal presentation device 301 includes an on/off button 348 to place the laser pointer element and the pointing device element in an on state or an off state. The third embodiment of the universal presentation device 301 also includes a selection switch 335 that may be used to operate the universal presentation device 301 in various modes. For example, the switch 335 may be a three-way switch to toggle between operation of the laser pointer, the pointing device, or a combination of the laser pointer and pointing device.

The laser pointer element includes the laser pointer lens 115 that is located at substantially one end of the first portion 305. It is noted that in alternative embodiments, the laser pointer lens 115 may be located along the surface of the first portion 305. The pointing device element of the third embodiment 301 includes a roller ball assembly 325. The roller ball assembly 325 includes a roller ball 320. In an alternative embodiment, the roller ball assembly 325 may be a touch pad assembly and the roller ball 320 would be replaced with a touch pad or surface. The pointing device element also includes one or more selection buttons (generally 330), e.g., 330a, 330b, 330c.

The second portion 310 of the third embodiment of the universal presentation device 301 includes the writing device element. The writing device element includes a writing tip 340 and a clip 345. The writing tip 340 is configured to extend and retract from a first end of the second portion 310. In one embodiment, the clip 345 may function as a pen "click" mechanism to extend or retract the writing tip from an interior of the second portion 310. The clip 345 is configured for placement along a surface of the second portion 310. A first end of the clip 345 may be fastened along the surface of the second portion 310 substantially towards the first end of the second portion 310. A second end of the clip 345 may be configured to rest against the surface of the second portion 310. In this configuration, the clip 345 is tensioned so that it may open to allow for an object, e.g., a shirt pocket, to slip between the second end of the clip 345 and the surface of the second portion 310.

Figure 3B:
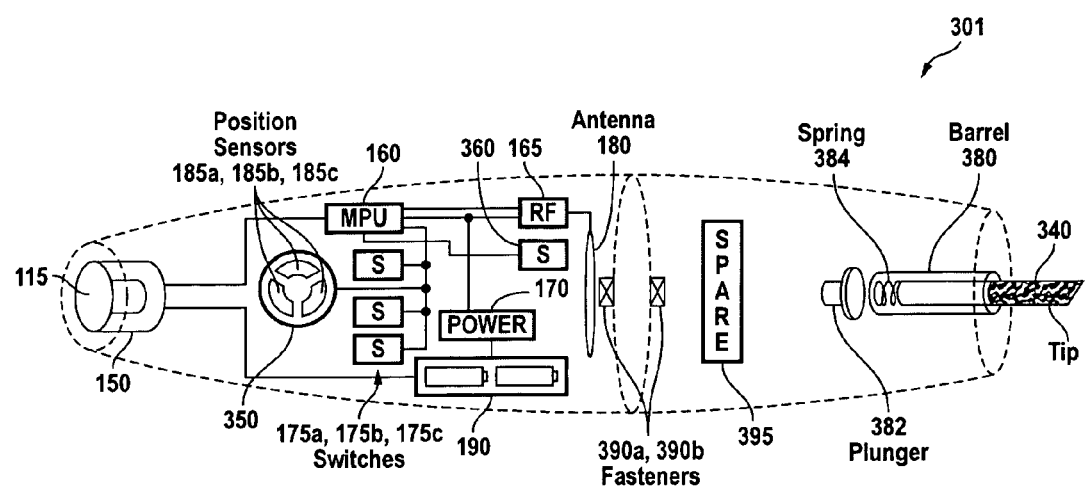
FIG. 3b is a block diagram illustration of components of the third embodiment of the universal pointing device in accordance with the present invention.

FIG. 3b is a block diagram illustration of components of the third embodiment of the universal pointing device 301 in accordance with the present invention. The first portion 305 of the third embodiment of the universal presentation device 301 includes the laser unit 150, the MCU 160, the RF unit 165, one or more switches 175, a ball cage 350 having one or more position sensors 185, the optional power management unit 170, the antenna system 180, and the power source unit 190. It is noted that a touch sensor pad may be used in place of the ball cage 350 for a touch pad-type device.

In one embodiment, the selection switch 335 couples with a selector switch 360 in the first portion 305. The selector switch 360 couples with the MCU 160 to allow a user to switch operation of the universal presentation device 301 to a laser pointer-only mode of operation, a pointing device-only mode of operation, or a dual laser pointer and pointing device mode of operation.

When the selector switch 360 is in the laser pointer-only mode of operation or the dual laser pointer and pointing device mode of operation, any one of the pointing device switches 175 may be programmed to turn on or turn off the laser unit 150. Further, when the selector switch 360 is in the pointing device-only mode of operation or the dual laser pointer and pointing device mode of operation, the pointing device switches 175 may also be programmed to function in conjunction with the other pointing device elements, for example, the one or more position sensors 185 that couple with the roller ball 320.

When the selector switch 360 selects a configuration that includes the pointing device mode of operation, the other pointing device elements are also powered and placed in an on state by the MCU 160 and the power source unit 190. For example, the RF unit 165 is turned on to generate radio frequency signals that correspond to movement information that the one or more position sensors 185 provide, or to transmit selection information corresponding to the pointing device element that the one or more pointing device switches 175 provide. The generated radio frequency signals are transmitted via the antenna system 180. The optional power management unit 170 is configured to manage power consumption for the pointing device portion as described above. Moreover, the functionality of the power management unit 170 may be extended to the laser pointer portion.

The second portion 310 of the third embodiment of the universal presentation device 301 includes a writing instrument assembly. For example, the writing instrument assembly may include a writing tip 340, a barrel 380, a plunger 382, and an optional spring 384. The barrel 380 is a conventional writing instrument barrel used to house some or all of a writing tip 340, for example, a pencil lead or a pen inkwell. The plunger 382 is a conventional plunger and the optional spring 384 is a conventional spring. The plunger 382 may couple with the clip 345 or some other mechanism on the surface of the second portion 310. When depressed, the plunger pushes down on the spring 384. This extends the writing tip 340 from the barrel 380 so that a user may write with the writing tip 340. Those of skill in the art will recognize other conventional writing instrument assemblies may be used in the third embodiment 301, for example, a gel roller pen, a felt tip pen, a chalk, a writing stylus or the like. It is noted that the second portion 310 may also include an optional spare compartment 395 for storage, for example, a spare writing tip or a spare battery.

As with the first embodiment 101, the third embodiment of the universal presentation device 301 is dimensioned to house a laser pointer element and a pointing device element. Further, the third embodiment of the universal presentation device 301 advantageously allows for simultaneous and independent use of the laser pointer element and the pointing device element, as well as a writing device element. For example, as discussed above, the pointing device element can be used to interact with an application program at the host computer while the laser pointer can be used to point to the host computer display or other object that is physically out of reaching distance. In addition, the writing device element can be used to make notes on a notepad, for example, as it relates to the presentation at hand.

Figure 4A:
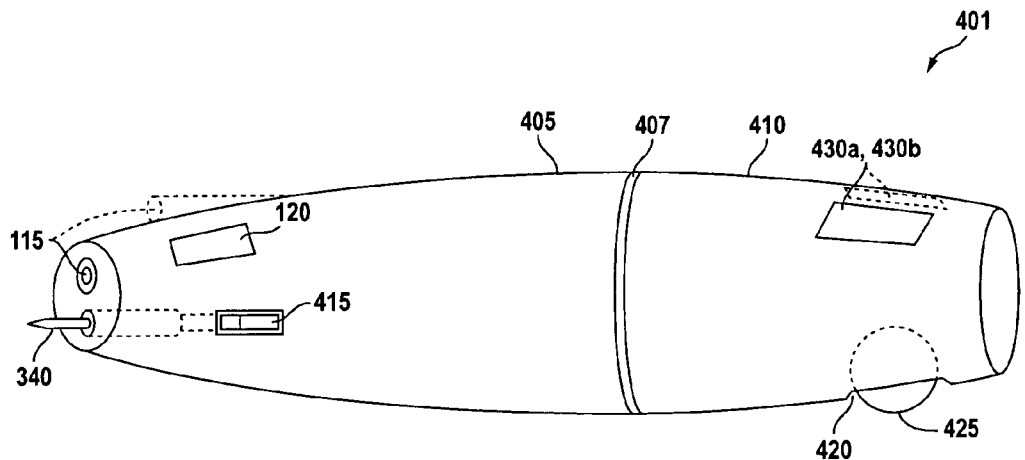
FIG. 4a is an illustration of a fourth embodiment of a universal presentation device in accordance with the present invention.

FIG. 4a is an illustration of a fourth embodiment of a universal presentation device 401 in accordance with the present invention. The fourth embodiment of the universal presentation device 401 includes a first portion 405, a second portion 410, and an optional band 407, similar to the three embodiments 101, 201, 301 described above. As with those embodiments the first and the second portions 405, 410 may be two separate physical portions that may be configured into a unitary device or may be two logically separate portions that may be configured to provide particular functionality at each portion.

For example, in the fourth embodiment of the universal presentation device 401, the first portion 405 may include a laser pointer element and a writing device element and the second portion 410 may include a pointing device element. The laser pointer element may be functionally similar to a conventional laser pointer device. The pointing device element may be functionally similar to a conventional computer pointing device, for example, a computer mouse-type device. The writing device element may be a conventional writing device, for example, a pen, a pencil, a chalk, a crayon, a marker, a highlighter or the like. The writing device element may also be a conventional stylus-type device, for example, a stylus for use with an electronic personal information manager.

The first portion 405 of the fourth embodiment of the universal presentation device 401 includes the laser pointer lens 115, the laser pointer switch button 120, the writing tip 340, and a writing device button 415. In one embodiment, the laser pointer lens 115 is located at a first end of the first portion 405. In an alternative embodiment (e.g., illustrated in a dashed line), the laser pointer lens 115 may be configured to be substantially perpendicular to the surface of the first portion so that the laser light beam can be directed towards the first end of the first portion. The laser pointer switch button 120 is configured for placement along the surface of the first portion 405. The writing device button 415 is a conventional writing device button that functions to extend or retract the writing tip 340 from within the first portion 405. The writing device button 415 is also configured to be placed along the surface of the first portion 405. The writing tip 340 extends and retracts from the first end of the first portion 405.

The second portion 410 of the fourth embodiment 401 includes one or more pointing device buttons (generally 430), e.g., 430a, 430b, and a roller ball 425. A surface of the second portion 410 is dimensioned to include a notched opening 420. The roller ball is located within the second portion 410 such that a portion of the roller ball 425 protrudes from the notched opening 420. In one embodiment the roller ball 425 protrudes an amount that is sufficient so that a surface of the roller ball is substantially in the same place as the surface of the second portion 410.

Figure 4B:
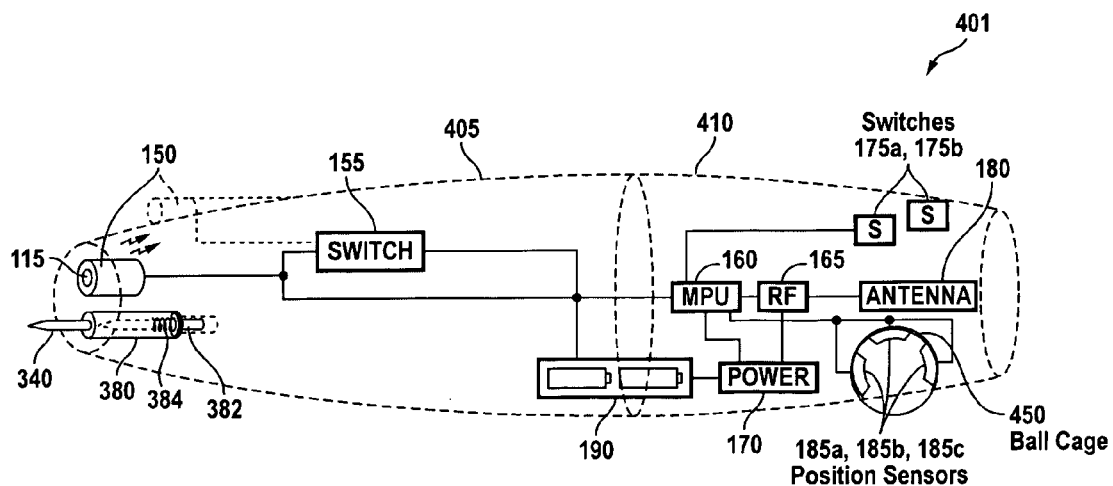
FIG. 4b is a block diagram illustration of components of the fourth embodiment of a universal presentation device in accordance with the present invention.

FIG. 4b is a block diagram illustration of components of the fourth embodiment of a universal presentation device 401 in accordance with the present invention. The first portion 405 of the universal presentation device 401 includes the laser unit 150 and the laser pointer switch 155. The laser unit 150 couples with the power source unit 190. The laser pointer switch 155 couples with the laser unit 150 and the power source unit 190. The laser pointer switch 155 also couples with the laser pointer switch button 120 of FIG. 4a.

The first portion 405 also includes the writing device element, which includes the writing instrument assembly. The writing instrument assembly includes the writing tip 340, the barrel 380, the plunger 382, and the optional spring 384. The writing tip 340 is configured to substantially reside within the barrel 380. The plunger 383 couples with the writing device button so that when the button is in a first position, the plunger 382 pushes down on the optional spring 384. This causes a portion of the writing tip 340 to extend from the barrel 380. When the writing device button 415 is in a second position, the plunger 382 releases the spring 384 and the writing tip 340 retracts back into the barrel. Those of skill in the art will recognize that the writing device element may be configured in a variety of ways including, for example, a fixed felt writing tip, a stylus, an auto-feed writing tip, and the like.

The second portion 410 of the universal presentation device 401 includes components for the pointing device element. This includes the MCU 160, the RF unit 165, the optional power management unit 170, the one or more switches 175, the antenna system 180, and a ball cage 450. The ball cage 450 includes the one or more position sensors 185. The MCU 160, the RF unit 165, and the optional power management unit 170 all couple with the power source unit 190. The RF unit 165 couples with the MCU 160 and the antenna system 180. The one or more switches 175 and the one or more position sensors 185 couple with the MCU 160. The one or more switches 175 respectively couple with the one or more pointing device switch buttons 430 of FIG. 4a. The ball cage 450 is configured to include the notched opening 420 of FIG. 4a. The ball cage 450 houses the roller ball 425 so that a portion of the roller ball 425 is exposed to the surface of the second portion 410 through the notched opening 420 while the remainder is within the ball cage 450. The portion of the roller ball 425 within the ball cage 450 may contact one or more of the position sensors 185.

When the pointing device element is operational, the universal presentation device 401 may be placed along a surface, e.g., a desk, a pad, or the like, so that the roller ball 425 touches against the surface through the notched opening 420. As the roller ball 425 is moved it contacts the one or more positional sensors, e.g., 185a 185b, and/or 185c, to transmit positional information to the MCU 160 relative to the contacted surface. The MCU 160 translates the positional information to send to the host system using radio frequency signals. Specifically, the RF unit 165 generates the radio frequency signals that are transmitted to a host computer via the antenna system 180. The MCU 160, RF unit 165, and the antenna system 180 also function with the one or more pointing device switches 175 to transmit selection information to the host computer when the first or the second pointing device switch buttons 430 are depressed by a user.

It is noted that the optional power management unit 170 is configured to manage power consumption for the pointing device portion as described above. Moreover, the functionality of the power management unit 170 may be extended to the laser pointer portion.

As with the other embodiments (e.g., 101, 201, 301) of the universal presentation device, the fourth embodiment 401 is dimensioned to house a laser pointer element and a pointing device element. In addition, the fourth embodiment 401 also advantageously allows for simultaneous and independent use of the laser pointer element and the pointing device element, as well as a writing device element. For example, as discussed above, the pointing device element can be used to interact with an application program at the computer host while the laser pointer can be used to point to the host computer display or to another object which is physically out of reaching distance. In addition, the writing device element can be used to make notes on a notepad, for example, as it relates to the presentation at hand.

Figure 5A:
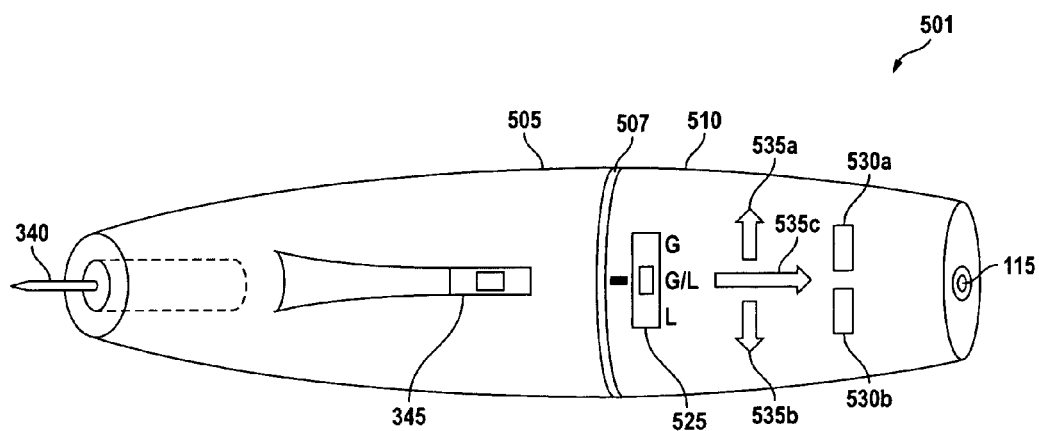
FIG. 5a is an illustration of a fifth embodiment of a universal presentation device in accordance with the present invention.

FIG. 5a is an illustration of a fifth embodiment of a universal presentation device 501 in accordance with the present invention. The fifth embodiment of the universal presentation device 501 includes a first portion 505, a second portion 510, and an optional band 507, similar to the other embodiments (e.g., 101, 201, 301, 401) described above. As with those embodiments the first and the second portions 505, 510 may be two separate physical portions that may be configured into a unitary device or may be two logically separate portions that may be configured to provide particular functionality at each portion.

For example, the first portion 505 may include a writing device element and the second portion 510 may include a laser pointer element and a pointing device element. The laser pointer element may be functionally similar to a conventional laser pointer, for example, an aim and turn-on presentation laser pointer-type device. The writing device element may be a conventional writing device, for example, a pen, a pencil, a chalk, a crayon, a marker, a highlighter or the like. The writing device element may also be a conventional stylus-type device, for example, a stylus for use with an electronic personal information manager.

In the fifth embodiment 501, the pointing device element may be functionally similar to a conventional computer pointing device, for example, a computer mouse-type device. Alternatively, the pointing device element may be a conventional gyroscope pointing device assembly. The conventional gyroscope pointing device assembly functions by moving, for example, a cursor on a screen based on movement of the gyroscopes within the fifth embodiment of the universal presentation device 501.

Looking more closely at the fifth embodiment of the universal presentation device 501, the first portion 505 includes a writing tip 340, and a clip (or selector) 345. The clip 345 is for extending the writing tip 340 from the first portion 505 or retracting the writing tip 340 into the first portion 505. The second portion 510 of the fifth embodiment 501 includes a switch unit 525 to select between operation of the gyroscopic assembly and/or the laser pointer assembly. The second portion 510 also includes the laser pointer lens 115, one or more selection buttons, (generally 530), e.g., a first selection button 530a and a second selection button 530b, and one or more direction pointers (generally 535), e.g., a first direction pointer 535a, a second direction pointer 535b, and a third direction pointer 535c. The selection buttons 530 are for use with either or both of the laser pointer element and/or the gyroscope pointing device element. The direction pointers 535 provide geometrical directional information for the gyroscopic device, for example, movement in an x-plane, a y-plane, or a z-plane.

Figure 5B:
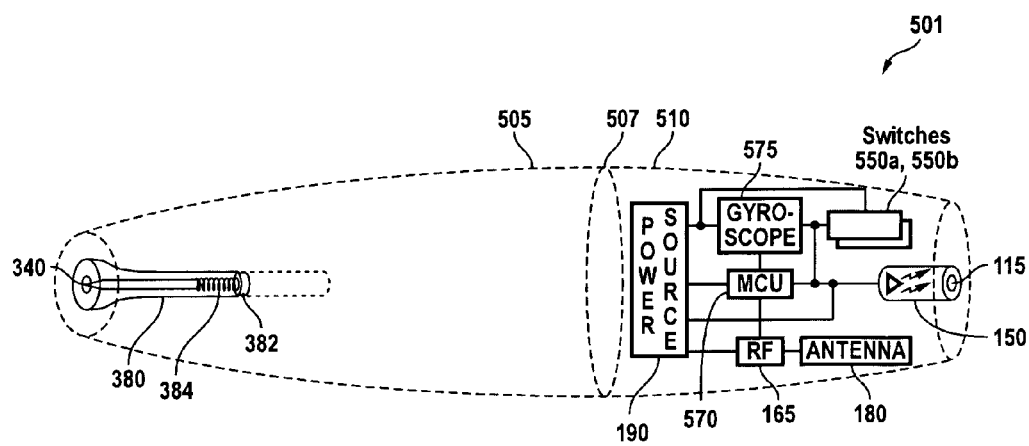
FIG. 5b is a block diagram illustration of components of the fifth embodiment of the universal presentation device in accordance with the present invention.

FIG. 5b is a block diagram illustration of components of the fifth embodiment of the universal presentation device 501 in accordance with the present invention. The first portion 505 includes the writing device element. For example, the writing device element may include the writing tip 340, the barrel 380, the plunger 382, and the optional spring 384. The barrel 380 is a conventional writing instrument barrel used to house some or all of a writing tip 340, for example, a pencil lead or a pen inkwell. The plunger 382 is a conventional plunger and the optional spring 384 is a conventional spring. The plunger 382 may couple with the clip 345 of FIG. 5a or some other mechanism on the surface of the second portion 510. When depressed, the plunger pushes down on the spring 384. This extends the writing tip 340 from the barrel 380 so that a user may write with the writing tip. Those of skill in the art will recognize other conventional writing instrument assemblies may be used in the fifth embodiment 501, for example, a gel roller pen, a felt tip pen, a chalk, a writing stylus or the like. Although not shown, similar to the third embodiment 301, the first portion may also include an optional spare compartment for storage, for example, a spare writing tip and/or a spare battery.

The second portion 510 of the universal presentation device includes components of the conventional gyroscope pointing device element and the conventional laser pointing element. For example, the second portion 510 includes the laser unit 150, a gyroscope microcontroller unit 570, the RF unit 165, the antenna system 180, the power source unit 190, a gyroscope unit 575, and one or more switches (generally 550), e.g., 550a, 550b.

The gyroscope microcontroller unit 570 couples with the gyroscope unit 575, the RF unit 165, the power source 190, and the switches 550. The gyroscope microcontroller unit 570 may also couple with the laser unit 150. The antenna system 180 couples with the RF unit 165. The power source 190 also couples with the gyroscope unit 575, the laser unit 150, the RF unit 165, and optionally with the switches 550. The switches 550 also couple with the buttons 530 of FIG. 5a.

The gyroscope microcontroller unit 570 is generally functionally similar to the MCU 160 described above and provides functionality for processing directional information conveyed by the gyroscope unit 575. The gyroscope unit 575 includes one or more gyroscopes to provide geometric and/or directional information in, for example, an x-plane, a y-plane, and/or a z-plane. The one or more switches 550 couple with the selection buttons and may be programmed through firmware or software to function with the gyroscope pointing device and/or the laser pointer device.

Those of skill in the art will recognize that the writing device element and the laser unit device element operate functionally similar to operations described above with regard to the other embodiments of the universal presentation device, e.g., 101, 201, 301, and/or 401. In addition, in the fifth embodiment 501, the gyroscope pointing device element functions similar to conventional gyroscope pointing devices. For example, when a user seeks movement in a particular direction, the user can motion (e.g., move, rotate, or turn) the gyroscope in that direction. The gyroscopes in the gyroscope unit 575 calculate the particular movement in particular geometric space or spaces. The gyroscope unit then sends this information to the gyroscope microcontroller unit 570, which is able to translate the information to movement on, for example, an application on a display of a host computer. The gyroscope microcontroller unit 570 sends the translated information to the host computer through the RF unit 165 and the antenna 180. Selection information from the switches 550 are sent to the host computer in a similar manner.

As with the other embodiments of the universal presentation device (e.g., 101, 201, 301, 401), described above the fifth embodiment of the universal presentation device 501 is dimensioned to house a laser pointer element and a pointing device element. Further, the fifth embodiment of the universal presentation device 501 advantageously allows for simultaneous and independent use of the laser pointer element and the pointing device element, as well as a writing device element. For example, as discussed above, the pointing device element can be used to interact with an application program at the host computer while the laser pointer can be used to point to the computer host screen (or elsewhere) from a physically out of reach distance. In addition, the writing device element can be used to make notes on a notepad, for example, as it relates to the presentation at hand.

Those of skill in the art will recognize that the exemplary embodiments described above, e.g., 101, 201, 301, 401, 501, are amenable to a modular design. For example, the band, e.g., 107, 207, 307, 407, 507 may be a physical separator that allows for interchangeability between portions of any particular embodiment.

Figure 6A:
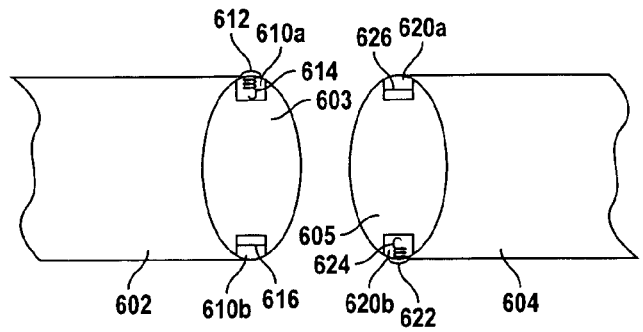
FIG. 6a is an illustration of a first embodiment of a fastening system for a universal presentation device in accordance with the present embodiment.

FIG. 6a is an illustration of a first embodiment of a locking or fastening system for a modular universal presentation device 601 in accordance with the present invention. Illustrated in FIG. 6a are an end of a first portion 602 and an end of a second portion 604, which are structurally similar to the first and second portions described with regard to the above exemplary embodiments. Also shown is a first interior portion 603, and a second interior portion 605. Within the first interior portion 603 is a first locking assembly and within the second interior portion 605 is a second (or reciprocal) locking assembly. One embodiment of the first locking assembly includes a first coupling unit 610a, a second coupling unit 610b, a release button 612, a spring fastener 614, and a fastening bar 616. One embodiment of the second locking assembly includes a first reciprocal coupling unit 620a, a second reciprocal coupling unit 620b, a release button 622, a spring fastener 624, and a fastening bar 626.

To couple the first and the second portions (602 and 604, respectively) a user joins the two portions such that the spring fastener 614 of the first coupling unit 610a connects with the fastening bar 626 of the first reciprocal coupling unit 620a. Similarly, the spring fastener 624 of the second reciprocal coupling unit 620b connects with the fastening bar 616 of the second coupling unit 610b. To release the first portion 602 from the second portion 604 the release buttons 612 and/or 622 may be depressed to release the springs 614 and/or 624, respectively from the corresponding fastening bars 626 and 616. Those of skill in the art will recognize that other locking or fastening assemblies or systems may also be used, for example, a protrusion and reciprocal notch assembly, a spring ball assembly, a snap tight assembly, or a threaded screw-like assembly.

The modular universal presentation device 601 advantageously allows for independent presentation elements to be interconnected in a variety of different manners. For example, one portion may be a laser pointer element and another portion may be a pointing device element that may couple together. Alternatively, one portion may be removed and replaced with a writing instrument element. The number of configurations is very flexible and therefore provides a user with a powerful presentation device.

Figure 6B:
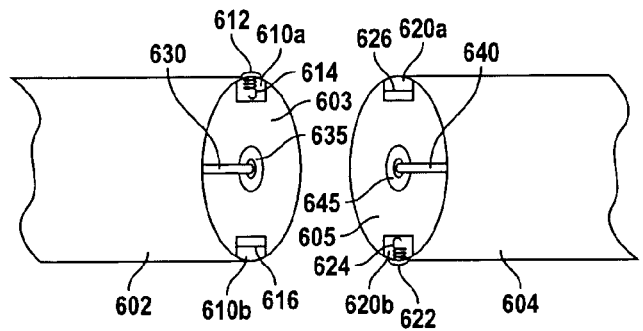
FIG. 6b is an illustration of a second embodiment of a fastening system with power source components for a universal presentation device in accordance with the present invention.

FIG. 6b is an illustration of a second embodiment of a locking or fastening system with exemplary power source components for a modular universal presentation device in accordance with the present invention. In addition to the components discussed with regard to FIG. 6a, shown in FIG. 6b are, for example, a first battery 635, a second battery 645, and respective battery contacts 630 and 640. When the first portion 602 couples with the second portion 604, the batteries 635 and 645, and battery contacts 630 and 640 couple together to provide a power source. One advantage of this configuration is that it allows for two battery powered device elements to each have their own power sources for independent operation, and also allows for joining of the power sources to provide a single logical power source when the elements couple together.

Figure 7:
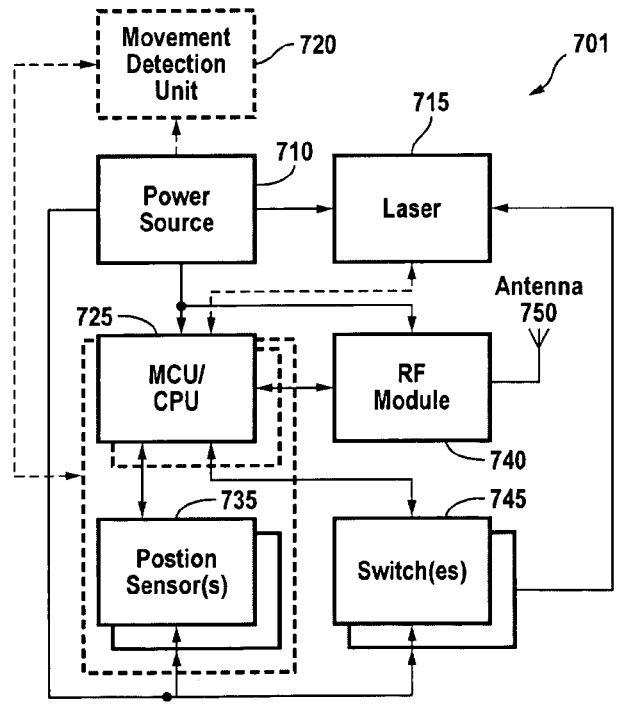
FIG. 7 is a block diagram illustration of one embodiment of electronic components for a universal presentation device in accordance with the present invention.

FIG. 7 is a block diagram illustration of one embodiment of electronic components for a universal presentation device 701 in accordance with the present invention. The universal presentation device 701 is generally functionally similar to the exemplary embodiments of the universal presentation device described above. The universal presentation device 701 includes a power source 710, a laser unit 715, a movement detection unit 720, a radio-frequency (RF) module 740, one or more switches 745, and an antenna 750. The movement detection unit 720 may include a microcontroller (MCU) (or or central processing unit with a memory area) 725 and one or more position sensors 735.

The power source 710 couples with the movement detection unit 720, including the MCU 725 and the position sensors 735. The power source 710 also couples with the laser unit 715, the RF module 740, and optionally with the switches 745. The MCU couples with the position sensors 735, the RF module 740, and the switches 745. The RF module 740 couples with the antenna 750. One or more of the switches 745 couples with the laser unit 715. Optionally, the MCU 725 couples with the laser unit 715.

The power source 710 is a conventional power source that provides power to the various components in the universal presentation device 710 that may require power. For example, the power source 710 may be a 1.5-volt or other direct-current power source, or source 710 may be an alternate-current power source. The laser unit 715 is a conventional coherent light-emitting device. For example, the laser unit 715 may be a class 1 laser diode or light-emitting diode type unit.

The movement detection unit 720 is a conventional module used to determine movement information including speed, location, and direction in a control device. For example, the movement detection unit 720 may be a mechanical mouse assembly, an optical mouse assembly, a trackball assembly, a touchpad assembly, or a gyroscope assembly. The position sensors 735 are conventional position sensors used to detect the movement information by the control device. For example, the position sensors may be rollers, photosensors, touch sensors, or gyroscopes. The MCU 725 is a conventional microcontroller that may include a processing unit and a memory area to process the movement information.

The switches 745 are conventional switches for use with the control device element as a selection mechanism, and may be for use with the laser pointer element as a switch to turn on/off the laser unit 715. The RF module 740 is a conventional RF system that can transmit data using a radio frequency signal. The antenna 750 may be a conventional "whip" antenna or loop antenna for transmitting RF signals. Those of skill in the art will recognize that the RF module 740 and the antenna 750 may be replaced with a microwave transmission module and microwave antenna to transmit data in a microwave frequency band.

The embodiment of the universal presentation device 701 operates functionally similar to the other embodiments of the universal presentation device, e.g., 101, 201, 301, 401, 501. For example, when the control device element is active, the position sensors 735 of the movement detection unit 720 detect movement of a control device movement mechanism, e.g., the rolling of a roller ball, the touching of a touch pad, the rotating of a gyroscope or the reflecting of an optical signal. The sensors 735 transmit this movement information to the MCU 725. The MCU 725 translates this position information into data information. The data information is sent to the RF module 740 to prepare it for transmission to a host system. The data is then transmitted in an RF signal to the host computer by the antenna 750. If the switches 745 indicate a user selection, this indication is also sent to the MCU 725. The MCU 725 translates this indication into data information. MCU 725 sends this data information to the RF module 740, which transmits the information as an RF signal through the antenna 750 to the host computer.

If the laser unit 715 is active, it may trigger on and off through selection of one or more of the switches 745. The laser unit 715 accordingly turns on or off its coherent light source to focus it in the direction desired, for example, on a computer screen where the control device was interacting with an application.

Figure 8:
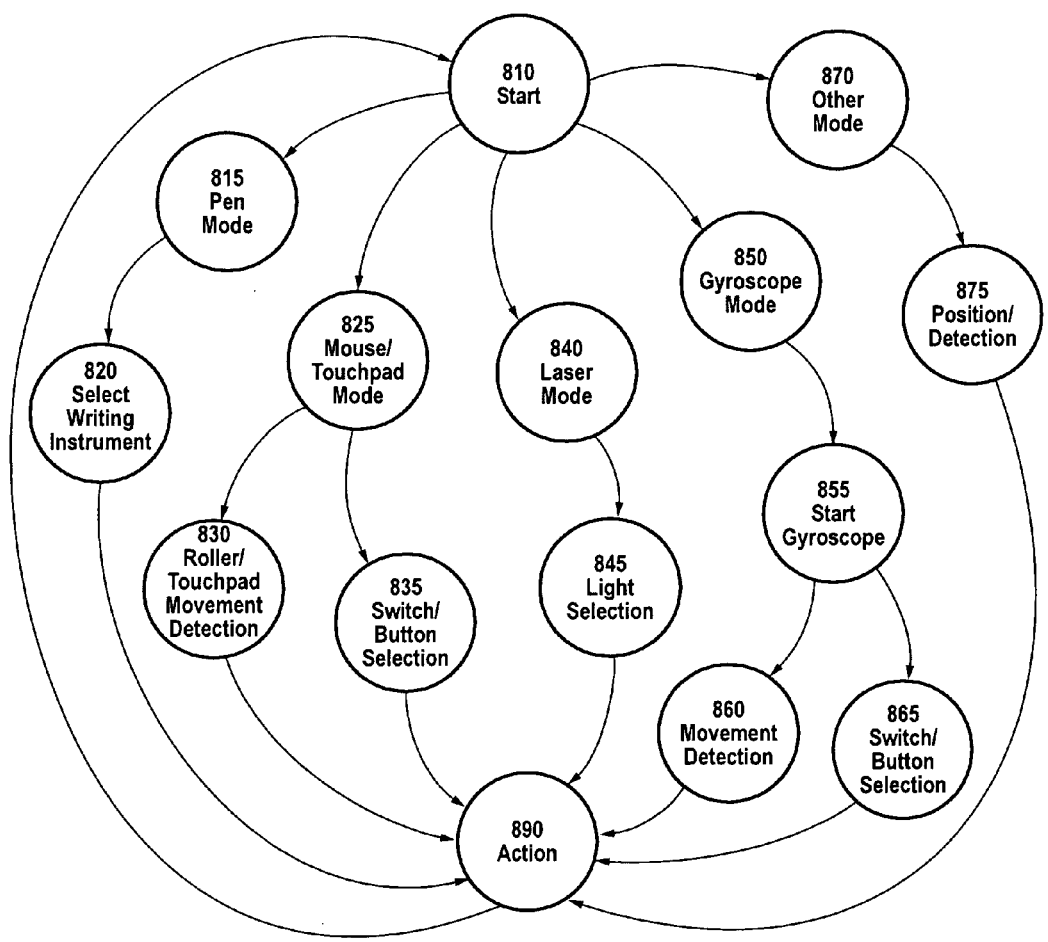
FIG. 8 is a state diagram illustration of one embodiment for operation of a universal presentation device in accordance with the present invention.

FIG. 8 is a state diagram illustration of one embodiment for operation of a universal presentation device in accordance with the present invention. The state diagram may apply to any one or combination of embodiments of the universal presentation device, e.g., 101, 201, 301, 401, 501, 601, 701, described above. Generally, at a start 810, a user may select among various modes of operation depending upon the features available with the universal presentation device. For example, a user may select between a pen mode 815, a mouse or touchpad (or trackball) mode 825, and/or a laser mode 840. If a mouse or touchpad is not present, a user may have another mode of operation available, for example, a gyroscope mode 850. Still other modes 870 of operation may also be available to the user.

Briefly each mode of operation will be described with regard to the state diagram. In the pen mode 815, the user selects 820 a writing device element on the universal presentation device. The user may then perform an action 890, for example, writing with the writing device on a piece of paper. In the mouse or touchpad mode 825, the user may move the universal presentation device in accordance with the particular mode present. This movement is detected 830. For example, the movement of one or more rollers, photosensors, and/or position sensors is detected. The detection 830 signals an action 890, for example, moving a cursor on a computer display diagonally a distance of 192 pixels. In addition, the mouse or touchpad mode also allows a user to select 835 a switch or a button that triggers a particular action 890, for example, selecting a word on a computer display.

In the gyroscope mode 850, the movement of the universal presentation device may start 855 the operation of gyroscopes within the system. The gyroscopes then detect 860 movement that is translated into an action 890, for example, moving a cursor on a computer display diagonally a distance of 50 pixels. In addition, the gyroscope mode also allows a user to select 865 a switch or a button that triggers a particular action 890, for example, selecting a word on a computer display.

In the laser pointer mode 840, the user selects 845 when to turn on or off the coherent light source. By turning on or off the coherent light source the action 890 conducted is to select or de-select an object by focusing or not focusing the coherent light source on that object. The state diagram also includes other modes 870 that can encompass other technologies applicable to the universal presentation device. For example, the other modes 870 may include voice activated position detection where the user voice may be used to navagate on a computer display. In this embodiment, the user selects 875 a position by dictating that position into a microphone on the universal presentation device. This positional information is translated into a communication signal and is relayed to a host computer, for example, by a radio-frequency or microwave frequency transmission. This results in an action 890, for example, moving a cursor on a computer display diagonally a distance of 300 pixels.

Figure 9:
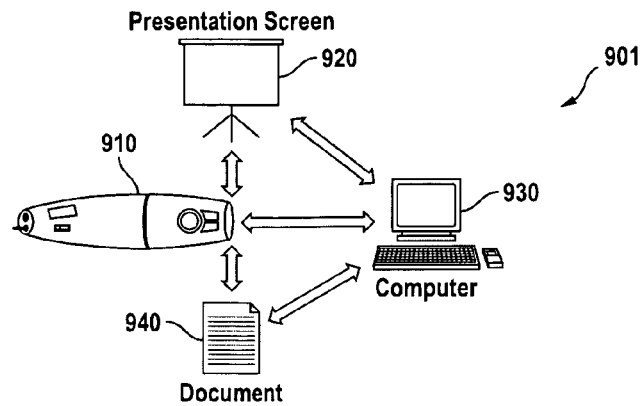
FIG. 9 is an illustration of an exemplar environment for using a universal presentation device in accordance with the present invention.

FIG. 9 is an illustration of one embodiment of an environment 901 for using a universal presentation device in accordance with the present invention. Shown is an embodiment of a universal presentation device 910 that is functionally similar to any one or combination of the exemplary universal presentation devices, e.g., 101, 201, 301, 401, 501, 601, 701 described above. The environment 901 includes the universal presentation device 910, a presentation screen 920, a host computer system 930, and a document 940. In the environment 901, the universal presentation device 910 couples with the host computer system 930 communicatively through, for example, radio frequency signals. This allows the pointing device feature of the universal presentation device 910 to function with an application running on the host computer system 930.

It is noted that the presentation screen 920 may be any object that functions as a presentation screen for a projected display, for example, a conventional movie or presentation screen, a wall, a projection screen, or the like. The host computer system 930 may be any conventional computer system, for example, a personal computer, a mainframe computer, a workstation computer, a personal digital assistant, a function specific computer (e.g., a mini web or Internet browser), or the like. The document 940 may be a conventional document in any form, for example, paper, poster board, transparency, chalk board, dry erase board, digital tablet, or the like.

Figure 10:
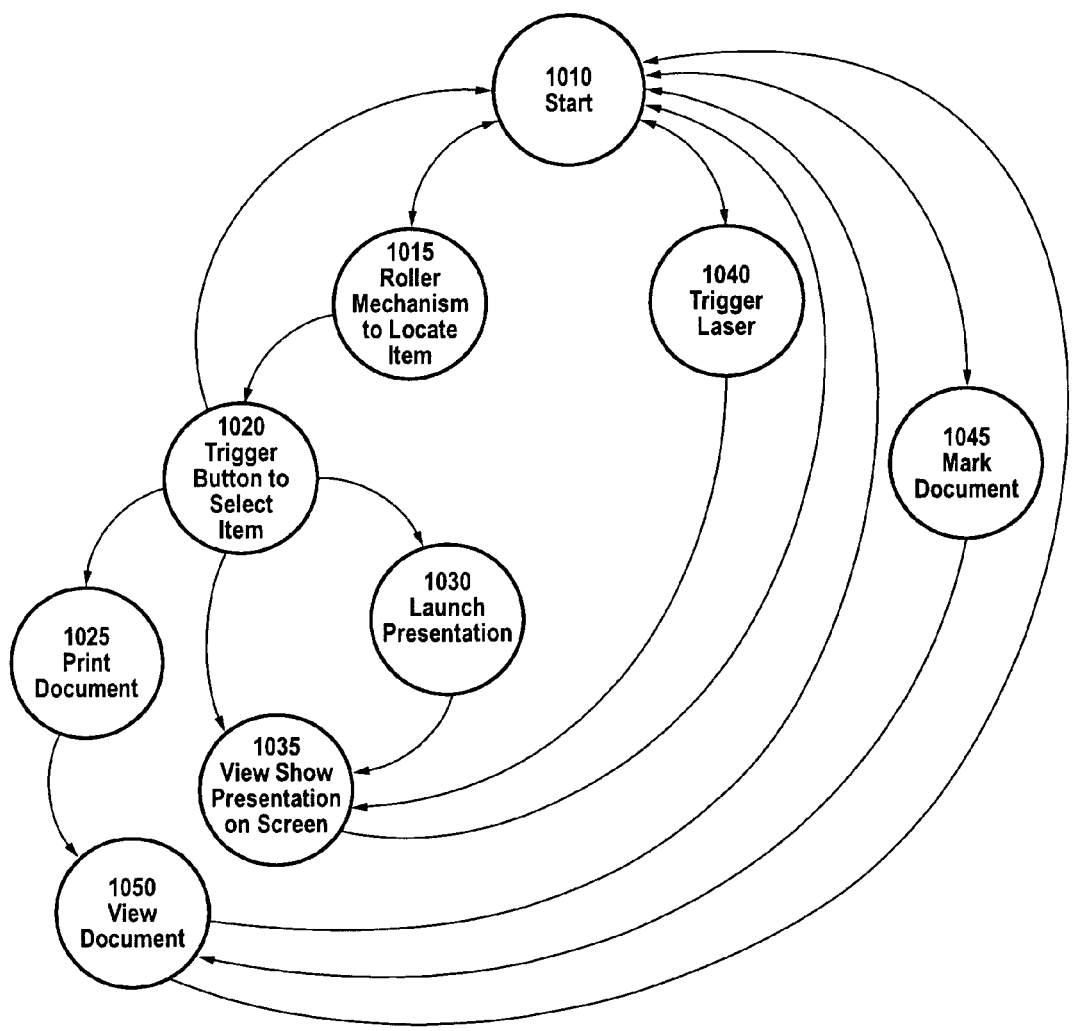
FIG. 10 is a state diagram illustration of one embodiment for a process of using a universal presentation device in a presentation environment in accordance with the present invention.

FIG. 10 is a state diagram illustration of an example of a process using the universal presentation device 910 in the presentation environment 901 in accordance with the present invention. For example, at the start 1010 of operation, a user may use a pointing device element of the universal presentation device 910 to select from the host computer system 930 a document, e.g., 940, to print out. This process may use a mechanism, for example, a roller ball, optical sensor, or touchpad, to locate 1015 the item for printing. A selection button associated with the pointing device element may be used to select 1020 the print function from the application running on the computer system 930. This causes the document to print 1025. The document can now be viewed 1050 on paper. Using a process similar to this, the user can also launch a presentation for viewing or showing 1035 on the presentation screen 920.

With regard to the printed document, the user marks 1045 the document using a writing device element on the universal presentation device 910. With regard to the presentation displayed on the presentation screen 920, the user may use the laser pointer element of the universal presentation device 910 by triggering 1040 the laser unit within the universal presentation device 910. This highlights a specific part of the image for viewing 1035 on the presentation screen 920 by turning on and focusing a laser (or coherent light) beam on the specific part of the presentation screen 920.

Figure 11:
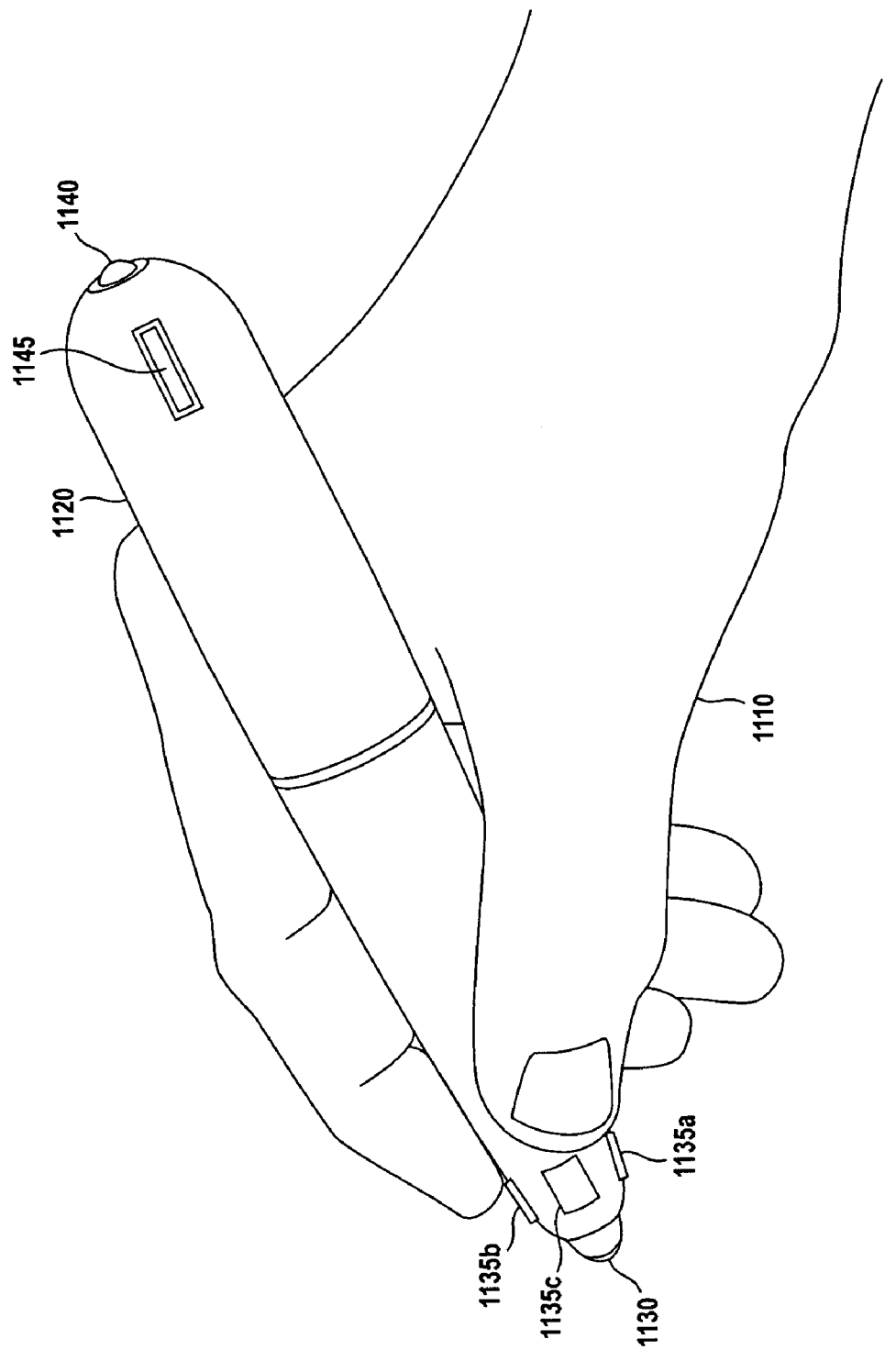
FIG. 11 is an illustration of a first example of using a universal presentation device in accordance with the present invention.
Figure 12:
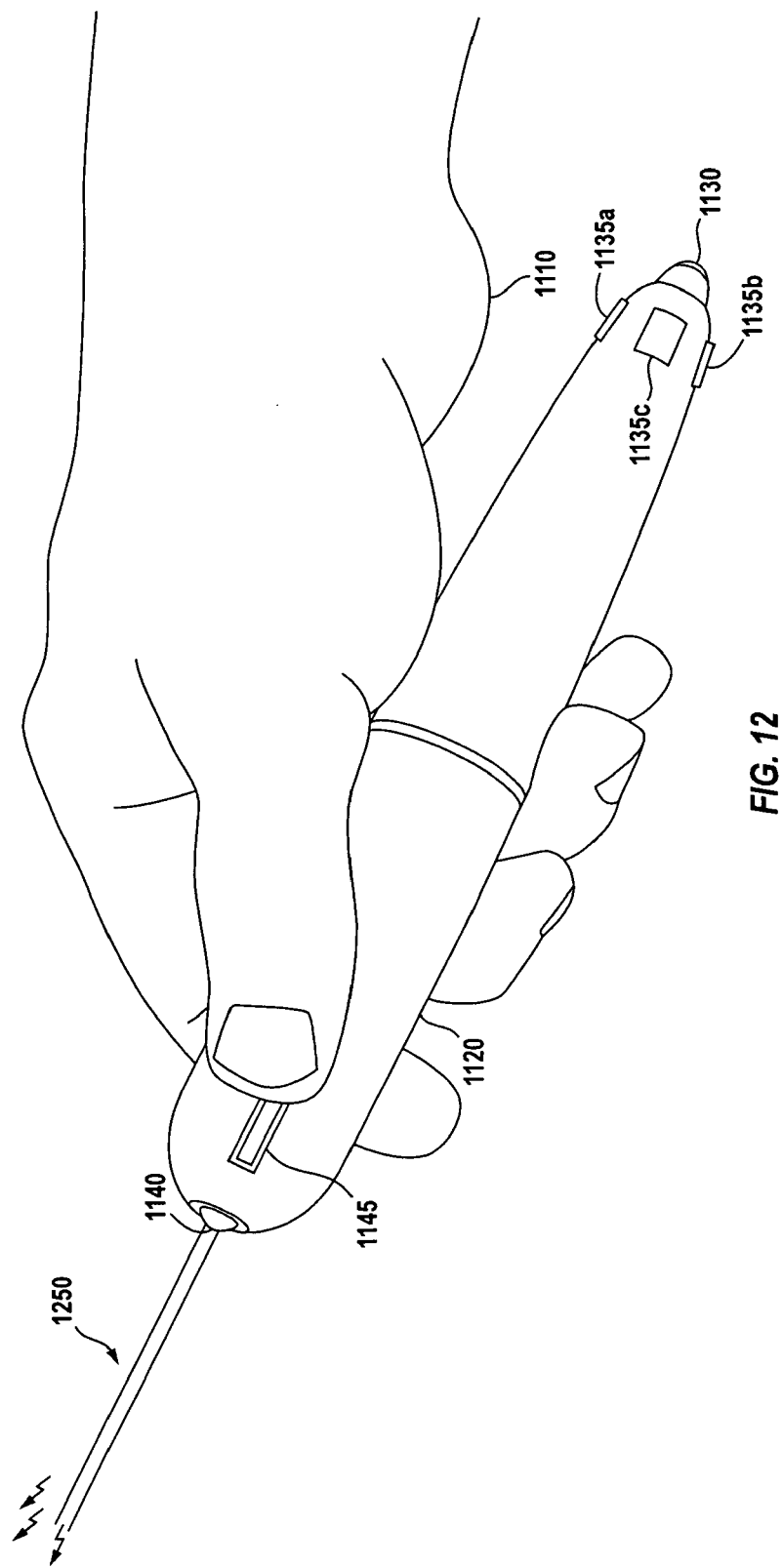
FIG. 12 is an illustration of a second example of using a universal presentation device in accordance with the present invention.
Figure 13:
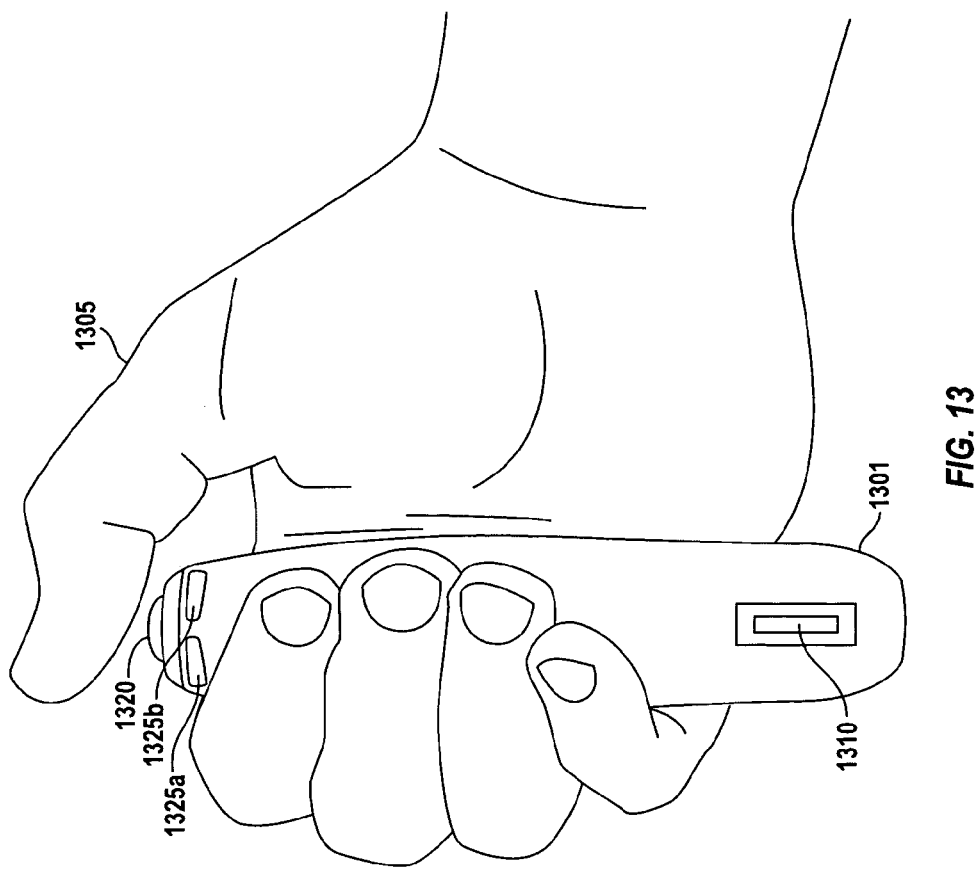
FIG. 13 is an illustration of a third example of using a universal presentation device in accordance with the present invention.

FIGS. 11, 12, and 13 illustrate examples of using various embodiments of a universal presentation device in accordance with the present invention. For example, FIG. 11 illustrates a first example of using a universal presentation device 1120 in accordance with the present invention. The embodiment 1120 is functionally similar to other embodiments of the universal presentation device described above, or combinations thereof. The embodiment 1120 shown includes a roller ball 1130, one or more selection buttons (generally 1135), e.g., 1135*a*, 1135*b*, 1135*c*, a laser pointer button 1145 and a laser pointer lens 1140. As is shown, a user 1110 may use the ninth embodiment similar to a pen-like instrument. For example, a user may roll the roller ball 1130 on a surface, for example, a desk, to appropriately move a pointing device cursor on a computer system having a display or monitor (e.g., included in a computer system 930).

FIG. 12 is an illustration of a second example of using the universal presentation device 1120 in accordance with the present invention. In this embodiment, the user 1110 can turn the device around to focus a coherent light beam 1250 from the laser pointer lens 1140 onto an object when depressing the laser pointer button 1145.

FIG. 13 is an illustration of a third example of using a universal presentation device in accordance with the present invention. The embodiment 1301 shown is functionally similar to other embodiments of the universal presentation device described above, or combinations thereof. The embodiment 1301 has a pointing device element that includes a roller ball 1320 and a one or more selection buttons (generally 1325), e.g., 1325*a*, 1325*b*. The embodiment 1301 also has a laser pointer that includes a laser pointer button 1310. In this exemplary embodiment, a user 1305 uses the roller ball of the pointing device element as a trackball that may be controlled by a digit on the hand, for example, a thumb. The same or another digit may select the selection buttons 1325. Alternatively, the roller ball 1320 can be controlled by any touching means that user 1305 is capable of performing.

The present invention advantageously provides an all-in-one, or universal, presentation device for a user. Moreover, embodiments of the present invention may be modular which beneficially allows for a user to configure a universal pointing device in any one of a number of combinations that is best suited for that user's needs.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A universal presentation device comprising:
  an electronic control device configured to communicatively couple with a computer system to provide a control mechanism for the computer system;
  a radio-frequency transmitter configured to communicatively couple the electronic control device with the computer system; and
  a coherent light source configured to provide a coherent light beam for pointing the coherent light beam on an object;
  a user-operable switch having a first state configured to select operation of the electronic control device, a second state configured to select operation of the coherent light source, and a third state configured to select operation of the electronic control device and the coherent light source for substantially simultaneously operating for combined operation of the electronic control device and the coherent light source, which are dimensioned to form a substantially unitary device when at least one of the electronic control device or the coherent light source is operational,
  a first housing portion including the electronic control device, a first power source, and a first electrical contact for the first power source; and
  a second housing portion including the coherent light source, a second power source, and a second electrical contact for the second power source, wherein
  the first housing potion and the second housing portion are separable and combinable,
  if the first housing portion and the second housing portion are combined, the first and second electrical contacts are configured to contact and the first power source and the second power source are configured to provide a single power source configured to be shared by the electronic control device and the coherent light source.

2. The universal presentation device in claim 1, wherein the substantially unitary device is dimensioned as a substantially elongated housing.

3. The universal presentation device in claim 2, wherein the coherent light beam is dispensed from a substantially first side of the substantially elongated housing.

4. The universal presentation device in claim 2, wherein a control mechanism of the electronic control device is mounted on substantially a first side of the substantially elongated housing.

5. The universal presentation device in claim 1, wherein a control mechanism of the electronic control device is mounted on a surface of a housing.

6. The universal presentation device in claim 5, wherein a control mechanism of the electronic control device and a lens of the coherent light source is mounted on substantially a first end of the housing.

7. The universal presentation device in claim 5, wherein a control mechanism of the electronic control device and a lens of the coherent light source are mounted on substantially opposite ends of the housing.

8. The universal presentation device in claim 6, further comprising a writing mechanism, the writing mechanism mounted in a substantially same side of the housing as at least one of either the control mechanism or the lens.

9. The universal presentation device in claim 3, wherein a control mechanism of the electronic control device is mounted on the substantially second side of the substantially elongated housing.

10. The universal presentation device in claim 3, wherein a control mechanism of the electronic control device is mounted on the substantially first side of the substantially elongated housing.

11. The universal presentation device in claim 1, further comprising a writing mechanism, wherein the writing mechanism couples with the electronic control device and the coherent light source to form a substantially unitary device when at least one from the group consisting of the electronic control device, the coherent light source, and the writing mechanism is operational.

12. The universal presentation device in claim 1, wherein the electronic control device comprises a gyroscope system, the gyroscope system mounted within a housing.

13. The universal presentation device in claim 12, wherein the gyroscope system includes a switch for making a selection on a display of the computer system.

14. The universal presentation device in claim 12, further comprising a writing mechanism, the writing mechanism and a lens of the coherent light source mounted in substantially a same side of the housing.

15. The universal presentation device in claim 12, further comprising a writing mechanism, the writing mechanism and a lens of the coherent light source mounted at substantially opposite sides of the housing.

16. A modular universal presentation device comprising:
a first presentation module configured to provide a first presentation function, the first presentation function including the use of an electrical circuit;
a second presentation module configured to provide a second presentation function; and
a releasable locking assembly configured to releaseably couple the first presentation module with the second presentation module to form a unitary article, wherein:
the first presentation module and the second presentation module are configured to be separable,
the first presentation module including a first power source and a first battery contact, and
the second presentation module including a second power source and a second battery contact
the first and second battery contacts are configured to contact if the first presentation module and the second presentation module are combined, and the first power source and the second power source are configured to provide one power source that is shared by the first presentation module and the second presentation module.

17. The modular universal presentation device in claim 16, wherein the first presentation module includes one from the group consisting of a laser pointer element and a pointing device element.

18. The modular universal presentation device in claim 16, wherein the second presentation module comprises a writing instrument element.

19. The universal presentation device of claim 1, further comprising a radio frequency receiver configured to communicatively couple the electronic control device with the computer system.

20. The universal presentation device of claim 1, wherein the electronic control device comprises an optical pointing device.

21. The universal presentation device of claim 1, wherein the electronic control device operates as an optical pointing device in a first mode and as an electronic slide-show controller in a second mode.

22. The universal presentation device of claim 21, further comprising a switch configured to select at least one of the first mode and the second mode.

23. The universal presentation device of claim 21, further comprising a power management unit configured to automatically switch between the first and second modes responsive to user input to the electronic control device.

24. The universal presentation device of claim 1, wherein the electronic control device is dimensioned to fit a user hand during operation.

25. The universal presentation device of claim 24, further comprising a switch coupled to the coherent light source and configured to activate the coherent light source independently of the electronic control device.

26. The universal presentation device of claim 1, wherein the universal presentation device communicatively couples with the computer system through a wireless communication link.

27. The universal presentation device of claim 1, further comprising a power management unit configured to turn off at least one of the electronic control device and the coherent light source in response to a predetermined condition.

28. The universal presentation device of claim 27, wherein the predetermined condition comprises user inactivity for a predetermined time period.

29. A universal presentation device comprising:
a communication means for communicating with a host system;
an application control means for controlling the host system;
a coherent light source means for generating a coherent light beam to light at least a portion of an object;
a housing means for housing the communication means, the application control mechanism means and the coherent light source means; and
a switching means for selecting operation of the coherent light source, the application control means, or the simultaneous combined operation of the coherent light source means and the application control means, wherein:
the housing means is configured to be separable into a first portion that includes the coherent light source means and a second portion the include the application control means,
the first portion includes a first power source and a first electrical contact,
the second portion includes a second power source and a second electrical contact, and
if the first portion and the second portion are combined, the first and second electrical contacts are configured to contact and the first power source and the second power are configured to form a single power source shared by the first portion and the second portion.

30. The universal presentation device of claim 29, wherein the communication means comprises a radio-frequency transmitter.

31. The universal presentation device of claim 29, wherein the application control means comprises a first presentation element.

32. The universal presentation device of claim 31, wherein the pointing device comprises one from a group consisting of an optical mouse, a conventional mouse, a trackball, and a touch-sensitive pad.

33. The universal presentation device of claim 31, wherein the pointing device comprises a solid-state roller.

34. The universal presentation device of claim 29, wherein the coherent light means comprises a laser diode and a lens.

35. The universal presentation device of claim 29, wherein the host system comprises a computer system.

36. In a universal presentation device, a method comprising the steps of:
combining a first portion of the device with a second portion of the device to contact a first electrical contact in the first portion to a second electrical contact in the second portion;
in response to contacting the first electrical contact and the second electrical contact, coupling a first power source in the first portion to a second power source in the second portion to provide a single power source to power a coherent light source in the first portion and an electronic control device in the second portion;
switching a switch to operate the coherent light source, the electronic control device, or the coherent light source and the electronic control device in combination substantially simultaneously;
communicating with a computer system,
receiving a user input via the electronic control device;

controlling the computer system in response to the user input, and providing the coherent light source for generating a coherent light beam to reflect off an object housing the electronic control device and the coherent light source in a unitary off an object.

37. The method of claim 36, wherein the step of communicating with the host system further comprises the step of transmitting data using a radio-frequency transmitter.

38. The method of claim 36, further comprising the step of selecting between controlling the host system and providing the coherent light source.

39. The method of claim 36, further comprising the step of switching between controlling the host system and providing the coherent light source.

40. The method of claim 36, wherein the host system comprises a computer system.

41. The universal presentation device of claim 31, wherein the first presentation element comprises a pointing device element.

42. The device of claim 1, wherein the electronic control device includes one of a roller ball, a touch pad, and a joystick disposed at a first end of the device and configured for use by a digit of a hand.

43. The device of claim 42, wherein the electronic control device further includes a set of control buttons that are configured for operation by one or more digits of the hand.

44. The device of claim 43, wherein the set of control buttons includes a laser-control button configured to control the coherent light source and one or more computer-control selection buttons, and wherein the set of buttons are configured for substantially simultaneous operation with the electronic control device.

45. The device of claim 44, wherein the digit includes a thumb, and the one or more digits includes one or more fingers.

* * * * *